Figure 1:
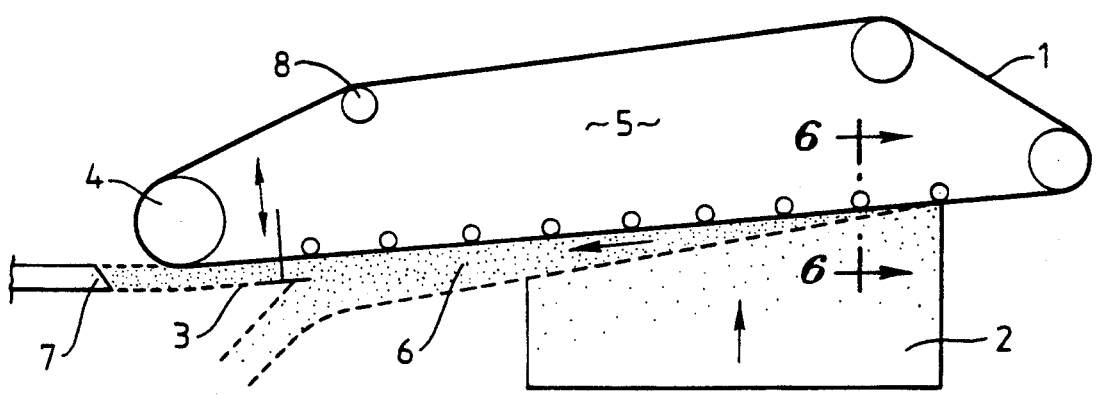

United States Patent
Beckh et al.

[11] Patent Number: 5,119,938
[45] Date of Patent: Jun. 9, 1992

[54] CONVEYOR BELT FOR CONVEYING A TOBACCO ROD

[75] Inventors: Gerhard Beckh; Manfred Schneider, both of Herbrechtingen; Werner Mager, Herbrechtingen-Bolheim, all of Fed. Rep. of Germany

[73] Assignee: Max Schlatterer GmbH & Co., Herbrechtingen, Fed. Rep. of Germany

[21] Appl. No.: 439,867

[22] Filed: Nov. 21, 1989

[30] Foreign Application Priority Data

Nov. 24, 1988 [DE] Fed. Rep. of Germany ....... 3839549

[51] Int. Cl.⁵ .............................................. B65G 15/34
[52] U.S. Cl. .................................. 198/847; 428/255; 428/296; 428/257; 428/258; 428/259
[58] Field of Search ............... 198/844, 847; 474/266, 474/267; 139/420, 426; 428/225, 296, 257, 258, 259

[56] References Cited

U.S. PATENT DOCUMENTS

| | | | |
|---|---|---|---|
| 4,457,968 | 7/1984 | Harvey | 139/420 X |
| 4,906,507 | 3/1990 | Grynaeus et al. | 428/296 X |
| 4,925,729 | 5/1990 | O'Connor | 428/296 |

FOREIGN PATENT DOCUMENTS

| | | |
|---|---|---|
| 2640949 | 5/1977 | Fed. Rep. of Germany. |
| 3538928 | 5/1986 | Fed. Rep. of Germany. |
| 1238895 | 7/1960 | France. |
| 787177 | 12/1957 | United Kingdom ........... 198/844 |

OTHER PUBLICATIONS

Publication: EMS-Grilon SA, Wendelinstrasse 1, 5000 Kohn 41, Federal Republic of Germany, "Swiss Polyamid Grilon (Schmelzklebegarne für die Bekleidungsindustrie)".

Primary Examiner—Joseph E. Valenza
Assistant Examiner—Keith L. Dixon
Attorney, Agent, or Firm—Spensley Horn Jubas & Lubitz

[57] ABSTRACT

An air permeable, continuous conveyor belt for conveying a tobacco rod in a cigarette rod machine including parallel warp threads (31) and parallel sections (30a) of weft threads (30), the intersection points of which are in a regular grid. At least one warp thread (31) and/or at least one weft thread (30) includes at least one carrier fiber and at least one melt fiber. The bonding points (32) achieved by melting of the intersection points are arranged in linear fashion. As a result, selective adhesion of the weft threads to the warp threads can prevent the separation of individual fiber particles without reducing the air permeability of the belt.

27 Claims, 4 Drawing Sheets

CONVEYOR BELT FOR CONVEYING A TOBACCO ROD

The invention relates to an air permeable, continuous conveyor belt for conveying a tobacco rod in a cigarette rod machine, said belt having parallel warp threads and—extending from one edge of said belt to the other—parallel sections of weft threads that form intersection points in a regular grid, said warp threads and said weft threads being synthetic.

The term "linear" refers to a linearity of the bonding points in the direction of the incorporated melt fiber. If the melt fiber is incorporated in a warp thread, the bonding points are in the longitudinal direction of the belt, while if the fiber is incorporated in a weft thread these bonding points are transverse to the belt in the direction of the weft thread, with the bonding points being arranged in linear fashion within the belt excepting the edge loops of the weft thread. The bonding points are therefore always linear longitudinally and/or transversely in the belt.

The term "melting" must be understood as a conversion of the melt fiber into a temporary liquefied state. "Melting" is achieved either by the provision of heat in any form or by the provision of any type of solvents, where melting in the second case can also be regarded as a selective disintegration or etching of the melt fibers.

A conveyor belt of this type for conveying a tobacco rod is known from German Patent Application 35 38 928. These conveyor belts are subjected to a vacuum in modern cigarette rod machines. Tobacco fibres spread out in a distributor are "upward-showered" by this vacuum from below onto the continuous conveyor belt, the so-called suction rod conveyor. The air current passing through the air permeable conveyor belt to the vacuum chamber guides the tobacco fibers from the tobacco "shower" to the belt, and suspends them from this belt until they are deposited as a fiber rod onto the cigarette paper at the format intake. The high machine speed means that the belt must have a high porosity and surface roughness in order to achieve efficient conveyance of the tobacco rod. The fabric of the suction belt is therefore preferably made from synthetic fibers with suitable weaves. This suction belt must withstand extreme stresses, since on the one hand operation with minimum textile substance is necessary in order to achieve a high air permeability, and on the other hand the fabric is subjected to very high wear by the high operating speed of over 600 m/min. As a result of these marginal conditions it is possible that fibers of the belt can become separated and get into the tobacco, impairing its flavour.

It is also known how to use a conveyor belt of this type that comprises a loose warp or loose weft and is reinforced at the selvedge and in the center of the belt by an increased set of the warp (French patent application 12 38 895). The belt is stretched under tension in a final process and set at a temperature between 100° C. and 120° C. in the stretched condition by fixing the stretched polymer warps. Melting—and thus a thermal conversion process of the materials used—does not however take place here.

A process is also known of impregnating a conveyor belt—used as a garniture belt in a machine—of the type mentioned at the outset with a sizing solution mixed with solvent after weaving, and then heat-treating the belt to fix it. Selective fixing, for example of the selvedges, is not feasible here. In addition, the surface of the original fabric is not etched in this process. Disintegration of the materials used and hence flowing of the material as in a melting process does not occur (German Patent Application 26 40940). In addition, air permeability as with a suction belt is not necessary.

It is known from the textile industry how to use multi-purpose yarns which are neither pure high-quality sewing threads nor pure fusible bonding yarns, but combine certain advantages of both products and have fundamental advantages over heat-sealing inserts. These multi-purpose yarns are preferably used as separation yarns for stitching or fixing various cuts, and can later be removed without leaving traces. However, they are also usable for reinforcing collars, cuffs and the like, where it is not important that the bonding points be confined to a particular area (brochure of EMS-GRILON SA, CH-7013 Domat/Ems "Swiss Polyamide Grilon, Schmelzklebegarne für die Bekleidungsindustrie").

The object underlying the invention is now to develop a conveyor belt of the type mentioned at the outset such that separation of individual fiber particles is prevented by selective adhesion of the weft threads to the warp threads without impairing the air permeability of the belt.

This object is attained, for example, where at least one of the warp threads or at least one of the weft threads include at least one carrier fiber and at least one melt fiber. The quantity of the melt fibers in comparison with the quantity of the carrier fibers affects the thickness and size of the bonding points. The bonding points achieved by melting the intersection points are arranged in linear fashion in the direction of the incorporated melt fiber.

In an embodiment of this type, the high air permeability is maintained by selective application of the adhesive in the form of melt fibers of a weft or warp thread to various intersection points of the fabric, but at the same time a reinforced connection between the weft and warp threads is achieved, since the hot melt fibers melt in a subsequent treatment process and flow around the threads at the intersection points. The conveyor belt achieves, in addition, a high resistance to wear and a high degree of machine efficiency. The intervals between the various belt changes are extended. This process allows the flow behaviour of these synthetic fibers, particularly when they are melting, to be selectively controlled, and prevents an uncontrolled, wide-area spread during the melting process.

In another embodiment, the synthetic melt fibers are processed in a preceding twist process with higher melting or non melting or disintegrating carrier fibers to give a compact thread.

In another embodiment of the conveyor belt, there is a further possibility of applying the melt adhesive of the melt fibers precisely to the intersection points. This two-component thread can be incorporated, preferably as a weft thread, for reinforcement of the adhesive action.

In another embodiment, a further advantage of this suction belt is noted by the reinforcement of the edges. The high machine speed and the resultant friction causes considerable wear on the guide elements in the vacuum area of the suction rod conveyor. Mechanical wear on these guide elements is considerably worsened by the tobacco dust passing through the belt at its edges and collecting in the belt guides. If the suction belt has been reinforced at these edges, the tobacco particles can no longer penetrate through the suction belt in this area. The result is a substantial reduction in wear on the machine components and on the conveyor belt.

The invention is described in greater detail using the drawings.

Figure 2:
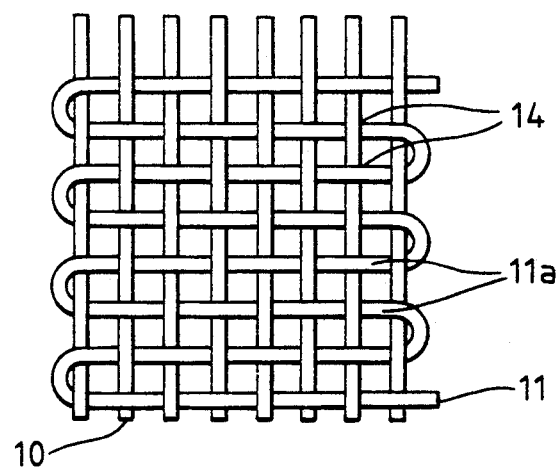
Figure 3:
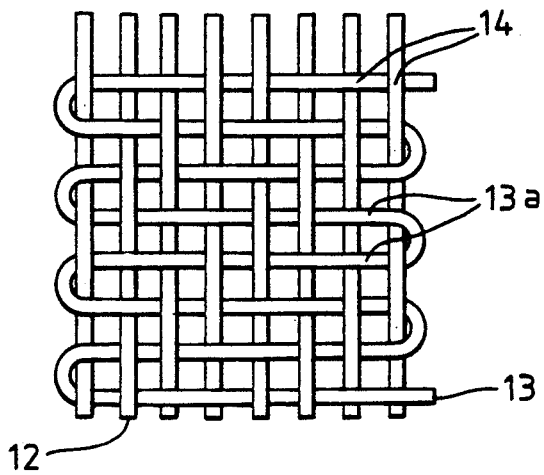
Figure 4:
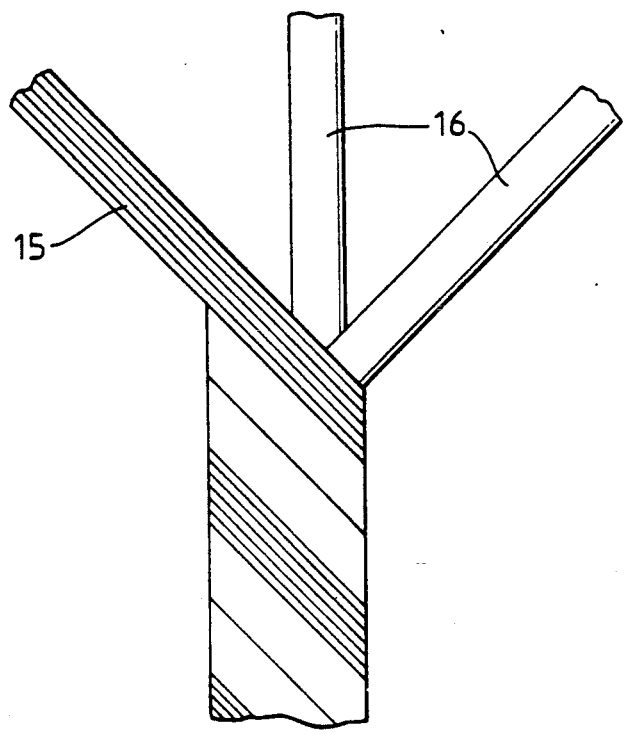
Figure 5:
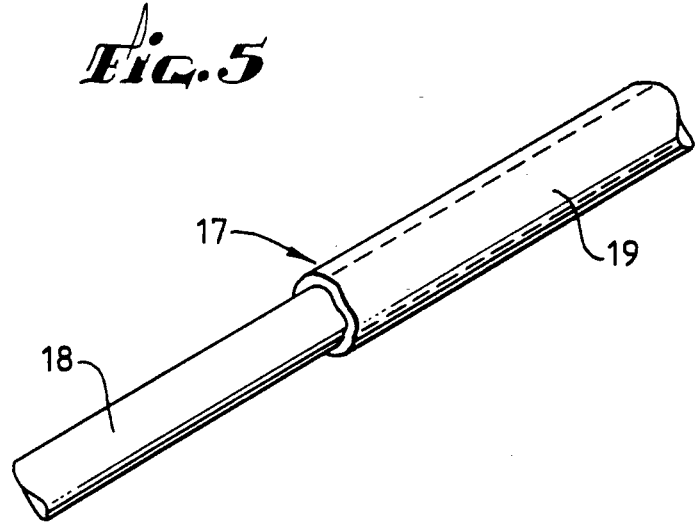
Figure 6:
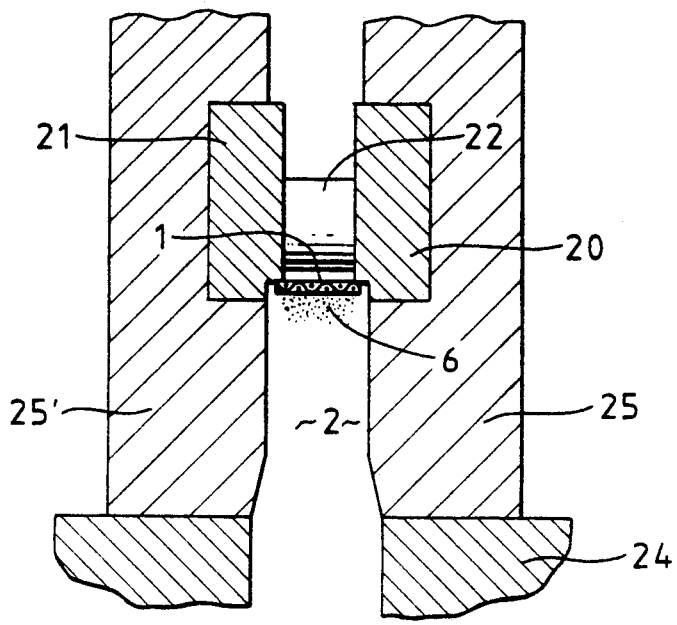
Figure 7:
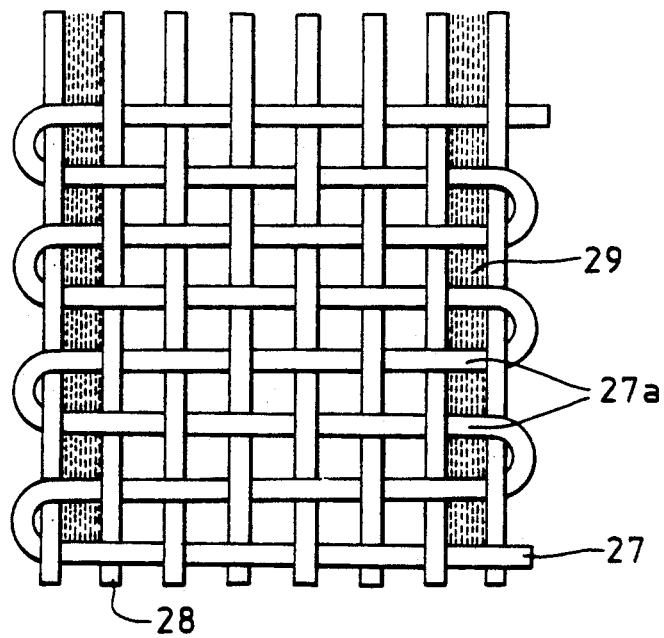
Figure 8:
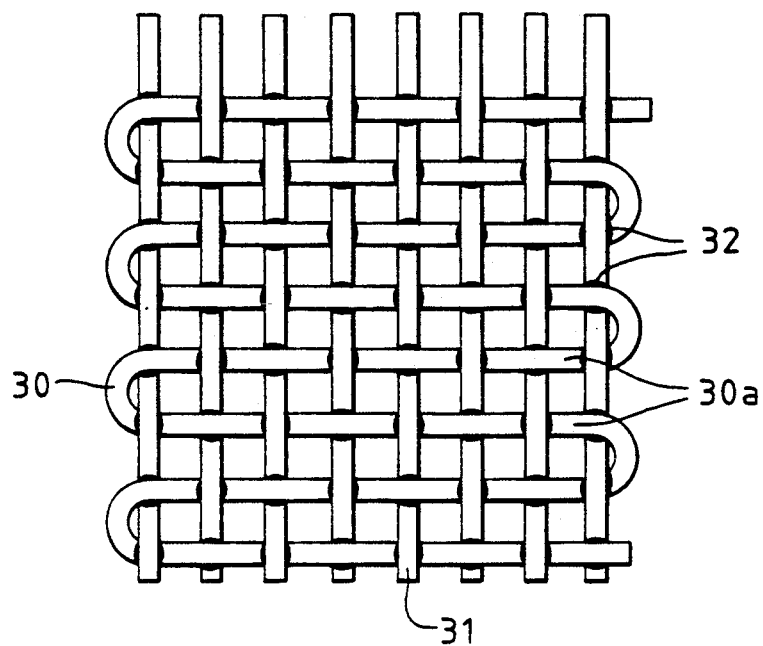
Figure 9:
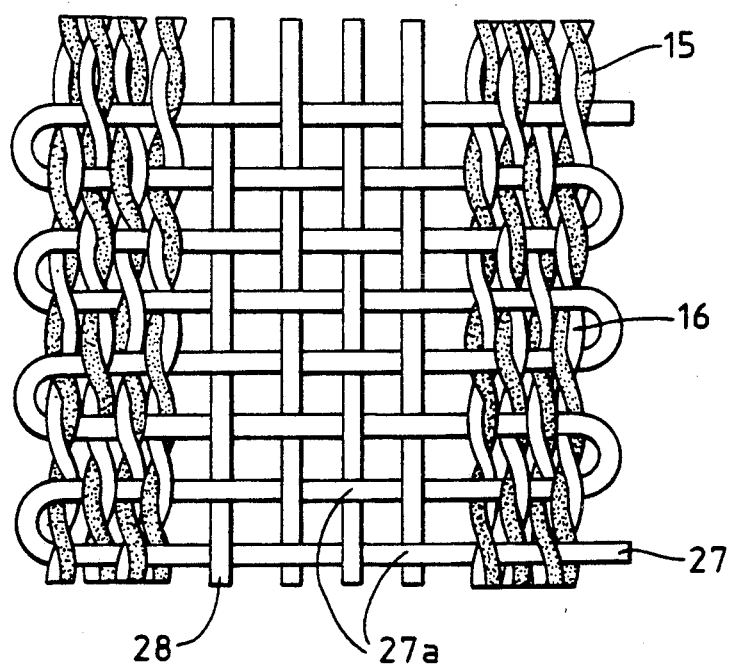

FIG. 1 shows a lateral diagram showing a suction rod conveyor of a cigarette rod machine, FIGS. 2, 3 show a diagram of porous, air permeable fabrics in linen weave L 1/1 and in twill weave K 2/2, FIG. 4 shows the structure of a thread in accordance with the invention, FIG. 5 shows the structure of a two-component thread, FIG. 6 shows a section through the suction rod conveyor in line VI—VI of FIG. 1, in enlarged form, FIGS. 7, 8 show a conveyor belt after melting of the melt fiber, with the melt fiber being used in the warp thread or in the weft thread, FIG. 9 shows a part of the conveyor belt in accordance with FIG. 7 prior to melting of the melt fibers.

FIG. 1 is a diagram of a suction belt of a cigarette rod machine for conveying a tobacco rod. The belt runs in a narrow vacuum shaft 2 as schematically indicated in FIG. 6 and is run on guide strips 20, 21. These guide strips 20, 21 project from the tobacco guide strips 25, 25' and slightly into the vacuum shaft 2 for guidance of the conveyor belt 1. The tobacco 6 is "upward-showered" by a vacuum generated in the vacuum chamber 5 along the walls 24 of the vacuum shaft 2 onto the conveyor belt 1. To prevent the conveyor belt 1 from being drawn into the vacuum chamber 5, rollers 22 are arranged along the lower side of conveyor belt 1 to support the belt. The conveyor belt is driven by driving pulleys 4 and deflected by deflecting pulleys 8. The irregularly "showered" tobacco 6 is cut off and straightened at a trimmer 3. The tobacco rod thus generated is then placed on a synchronously running cigarette paper strip 7, which is drawn off a bobbin not shown in the drawing. Cigarette paper strip 7 and deposited tobacco 6 are shaped into the finished product—the cigarette—during the further course of production. As can be seen from FIGS. 2 and 3, the air permeable continuous conveyor belt 1 comprises parallel warp threads 10, 12, 28, 31 and parallel sections 11a, 13a, 27a, 30a of weft threads 11, 13, 27, 30. The warp and weft threads form intersection points 14 in a regular grid. At least one warp thread 28, 31 and/or at least one weft thread 27, 30 comprises at least one carrier fiber 16, 18 and at least one melt fiber 15, 19 (FIGS. 4, 5). In a subsequent treatment involving application of tension, the intersection points 14 are connected to bonding points 29, 32, so that the warp and weft threads are firmly connected to one another. Thanks to the incorporation of the melt fiber 15, 19 in connection with a weft or warp thread, the bonding points 29, 32 are arranged in linear pattern. The warp threads 10, 12, 28, 31 and the weft threads 11, 13, 27, 30 are synthetic.

The bonding based on melting the melt fibers is performed by heating at least parts of the entire belt to the melting temperature of the melt fiber.

If necessary the heat can be applied only partially to certain areas of the belt.

The monofilament or multifilament melt fiber comprises, for example, low melt synthetic material, while the carrier fibers comprise a material with a higher melting point. The thread made of melt fiber 15, 19 and carrier fiber 16, 18 is incorporated differently into the belt fabric. Firstly, there is the possibility of twisting the melt fiber 15 with other higher melting carrier fibers 16 to form a thread. The illustration provided in FIG. 4 identifies the structure of such a thread. For example, the carrier fibers 16 are wound in a helix so as to be parallel to the melt fiber 15. Another possibility is to extend carrier fibers 16 in a straight line along the axis of the fiber and to wind some carrier fibers 16 and melt fibers 15 in a helix around that carrier fiber. A further possibility is to incorporate the hot melt fiber doubled with the carrier fiber. A belt of this type, that has already been subjected to the necessary post-treatment, is shown in FIG. 7. However, the following treatment generates heat pockets at the bonding points 29, 32, so that melting is under less tight control than with the first variant. The first variant also offers the possibility of using the thread as a homogeneous thread that can be woven into the fabric at any point. This possibility also exists in a further embodiment, in which the thread 17 is a two-component thread whose core 18 is designed as a carrier fiber and whose jacket 19 is a melt fiber. A two-component thread of this type can be used preferably as a weft thread for further reinforcement of the fabric and then forms—with appropriate dosing of the melt fiber—a fabric as shown in FIG. 8.

In a multifilament hot melt fiber, comprising for example polyamides or polyesters, the temperature necessary for melting can be reduced to the eutectic temperature by mixing groups of different hot melt fibers, for example the polyamide groups 6 with a melt temperature of 190° C. and polyamide group 12 with a melt temperature of 140° C. The hot melt fibers can also comprise an extruded monofilament fiber.

Melting takes place in a subsequent treatment operation by the addition of heat. The hot melt fibers can also be glued by application of solvents or solvent vapours or by heat and moisture, i.e. stream.

Liquefaction of the adhesive when the belt is manufactured can take place either by supplying heat from an appropriate heat source or by supplying steam in a heating shaft. When solvents are used the belt is passed through a suitable bath until the melt fibers are etched. Suitable measures can be taken here to prevent any harm to the environment. It is also conceivable to use water as the solvent.

The quantity of melt fibers in comparison with the quantity of carrier fibers affects the thickness and size of the bonding points. The adhesive action is here preferably achieved by incorporating the melt fiber inside a fiber preferably in the thread direction, so that a selective adhesion is possible.

As FIGS. 7, 9 show, reduced lateral spacing of the warp threads 28 with incorporation of the melt fibers in a warp thread and appropriate dosing of the melt fibers produces a closed adhesion area of bonding points 29 in rows.

The melting point of the hot melt fiber is between around 80° C. and 120° C. This temperature range is not achieved during operation of the belt in the cigarette rod machine, since the belt is continuously cooled by the air flow. A belt made in this fashion of polyamide fibers has the properties described in the following. If a twill weave is used as shown in FIG. 3, the belt acquires a rough surface. It has an assured temperature resistance up to 80° C., and the belt elongation is 1% based on the belt width 8.2 mm and with application of a force of 50 Newtons. The breaking strength of the belt is, based on the width of the belt, 450 Newtons in the belt and 350

Newtons at the join where the two ends are welded together. A belt of this type is normally 4 m long, 8 mm wide and 0.75 mm thick. The air passage through this belt is 42 m$^3$/h over a measurement area of 700 mm$^2$ and with a vacuum of 15 mbars.

In one embodiment, warp and weft threads comprise polyamide monofilament. The melt fiber comprises a polyamide having a lower melting point than the associated carrier fiber. In the case of a disintegration of the melt fiber using solvents, polyamide copolymers are preferably used, with methanol, for example, being used as the solvent. In any event the thickness of the individual threads is mainly between 0.2 and 0.3 mm. If required, however, other thicknesses can be used. If melt fibers and carrier fibers are processed doubled, two part threads are adjacent to one another that comprise the material used for the individual fibers and each have a thickness in the given range. If a two-component thread is used, the core 18 has the same thickness as in the other embodiments. Over this core 18 is the jacket in a thickness of preferably 0.02 to 0.05 mm. In the suction belt 1 itself, the warp thread density is 27 threads/cm and the weft thread density 14 threads/cm in the concrete embodiment.

It should be pointed out additionally that in a belt of this type the separation of fibers from the belt is almost completely prevented. This ensures that no fibers can get into the finished product, the cigarette, where they would at the very least impair the flavour.

Melt fibers used are, for example, thermoplastics such as polyamides or polyurethanes that melt in the stated temperature range. During melting, these fibers are altered in their warp structure and enclose the intersection points. The supply of melt fibers to the suction belt can also be achieved by, for example, spot application, such as by a program-controlled automatic machine (not shown in the drawing) at the intersection points prior to the melting operation. Consolidation then also follows during subsequent melting of the melt fibers. The necessary linearity is here already achieved by the automatic unit during application, by attaching the melt fibers to the intersection points along a certain thread.

We claim:

1. An air permeable continuous conveyor belt for conveying a tobacco rod in a cigarette rod machine, said belt having two opposed longitudinal edges and comprising:
   first thread means including a plurality of parallel synthetic warp threads; and
   second thread means including at least one synthetic weft thread extending from one edge of the belt to the other edge of the belt;
   said first and second thread means being woven together to form a plurality of intersecting points between said first and second thread means, a predetermined number of said plurality of intersecting points comprising bonding points;
   wherein at least one of said first and second thread means includes at least one carrier fiber and at least one hot melt fiber, said first and second thread means are bonded together at said bonding points by temporary melting of said at least one hot melt fiber such that said bonding points are separated from one another by regions of said belt where said thread means are not bonded together, each bonding point having a size and thickness determined by the quantity of hot melt fibers in comparison with the quantity of carrier fibers; and
   said bonding points are arranged in a linear fashion with respect to the direction of the at least one hot melt fiber.

2. A conveyor belt according to claim 1, wherein said at least one hot melt fiber is twisted with said at least one carrier fiber to form a thread.

3. A conveyor belt according to claim 2, wherein said at least one hot melt fiber is an extruded monofilament fiber.

4. A conveyor belt according to claim 2, wherein said at least one hot melt fiber can be melted by application of at least one of solvents and solvent vapors.

5. A conveyor belt according to claim 2, wherein said at least one hot melt fiber can be melted by application of at least one of heat and moisture.

6. A conveyor belt according to claim 2, wherein said at least one hot melt fiber can be melted by application of heat.

7. A conveyor belt according to claim 2, wherein said thread formed from said at least one hot melt fiber and said at least one carrier fiber is usable selectively as a warp thread in the edge area of said conveyor belt.

8. A conveyor belt according to claim 2, wherein a thermoplastic is used as said at least one hot melt fiber, a melting point of the thermoplastic being between approximately 80° C. and approximately 120° C.

9. A conveyor belt according to claim 2, wherein said at least one hot melt fiber is a monofilament fiber.

10. A conveyor belt according to claim 2, wherein said at least one hot melt fiber is a multifilament fiber.

11. A conveyor belt according to claim 1, characterized in that said at least one hot melt fiber is doubled with other higher melting carrier fibers to form a thread.

12. A conveyor belt according to claim 11, wherein said at least one hot melt fiber is an extruded monofilament fiber.

13. A conveyor belt according to claim 11, wherein said at least one hot melt fiber can be melted by application of at least one of solvents and solvent vapors.

14. A conveyor belt according to claim 11, wherein said at least one hot melt fiber can be melted by application of at least one of heat and moisture.

15. A conveyor belt according to claim 11, wherein said at least one hot melt fiber can be melted by application of heat.

16. A conveyor belt according to claim 11, wherein said thread formed from said at least one hot melt fiber and said at least one carrier fiber is usable selectively as a warp thread in the edge area of said conveyor belt.

17. A conveyor belt according to claim 11, wherein a thermoplastic is used as said at least one hot melt fiber, a melting point of the thermoplastic being between approximately 80° C. and approximately 120° C.

18. A conveyor belt according to claim 1, wherein at least one of said first and second thread means is a two-component thread having a core designed as a carrier fiber.

19. A conveyor belt according to claim 18, wherein said at least one hot melt fiber is an extruded monofilament fiber.

20. A conveyor belt according to claim 18, wherein said at least one hot melt fiber can be melted by application of at least one of solvents and solvent vapors.

21. A conveyor belt according to claim 18, wherein said at least one hot melt fiber can be melted by application of at least one of heat and moisture.

22. A conveyor belt according to claim 18, wherein said at least one hot melt fiber can be melted by application of heat.

23. A conveyor belt according to claim 18, wherein at least one of said first and second thread means is usable selectively as a warp thread in the edge area of said conveyor belt.

24. A conveyor belt according to claim 18, wherein a thermoplastic is used as said at least one hot melt fiber, a melting point of the thermoplastic being between approximately 80° C. and approximately 120° C.

25. A conveyor belt according to claim 18, wherein the two component thread includes a monofilament hot melt fiber jacket.

26. A conveyor belt according to claim 18, wherein the two component thread includes a multifilament hot melt fiber jacket.

27. A conveyor belt according to claim 1, wherein each of said first and second thread means includes at least one said carrier fiber and at least one said hot melt fiber.

* * * * *